United States Patent [19]
Grauberger

[11] Patent Number: 4,919,316
[45] Date of Patent: Apr. 24, 1990

[54] FISHING ROD HOLDER

[76] Inventor: Gerald D. Grauberger, Rte. 4, 13811 Beal Rd., Sterling, Colo. 80751

[21] Appl. No.: 287,098

[22] Filed: Dec. 20, 1988

[51] Int. Cl.5 .................. B60R 9/08; A01K 97/10
[52] U.S. Cl. .................. 224/42.42; 224/922; 248/523; 248/548; 43/21.2
[58] Field of Search ............ 224/42.42, 42.45 R, 224/922; 248/538, 520, 523, 56, 57; D22/147, 148; 114/364; 440/104, 105, 108; 43/15, 17, 27.4, 21.2

[56] References Cited

U.S. PATENT DOCUMENTS

| | | | |
|---|---|---|---|
| D. 200,474 | 3/1965 | Boldosser | D22/147 |
| D. 261,581 | 11/1981 | Buchanan | D22/147 |
| 1,527,463 | 2/1925 | Bastman | 43/18.1 |
| 2,680,923 | 6/1954 | Hland | 43/18.1 |
| 2,693,046 | 11/1954 | Langevin | 43/17 |
| 2,902,789 | 9/1959 | Mehr | 43/18.1 |
| 2,946,546 | 7/1960 | Pokorny et al. | 248/534 |
| 2,981,509 | 4/1961 | Messenger et al. | 248/538 |
| 3,076,668 | 2/1963 | Famely | 248/56 |
| 3,121,290 | 2/1964 | Brown | 43/18.1 |
| 3,557,483 | 1/1971 | Wilson | 43/20 |
| 3,782,613 | 1/1974 | Davis | 224/253 |
| 4,017,998 | 4/1977 | Dumler | 43/21.2 |
| 4,375,731 | 3/1983 | Budd | 43/21.2 |
| 4,425,729 | 1/1984 | Miyamae | 248/538 |
| 4,485,579 | 12/1984 | Hawie | 248/538 |
| 4,520,976 | 6/1985 | Cournoyer et al. | 248/56 |
| 4,578,891 | 4/1986 | Murray | 43/21.2 |
| 4,749,162 | 6/1988 | Wanzor | 248/558 |
| 4,778,141 | 10/1988 | Bogar | 248/538 |

Primary Examiner—Henry J. Recla
Assistant Examiner—Casey Jacyna
Attorney, Agent, or Firm—Dean P. Edmundson

[57] ABSTRACT

A fishing rod holder for insertion into an existing beverage holder opening in a boat for the purpose of receiving and supporting the handle end of a fishing rod. The fishing rod holder includes a tubular body member having a flange at its upper end and a tubular receiver secured within the body member. The handle end of the fishing rod can be inserted into and retained within the tubular receiver.

12 Claims, 2 Drawing Sheets 4,919,316

FISHING ROD HOLDER

FIELD OF THE INVENTION

This invention relates to fishing rod holders. More particularly this invention relates to fishing rod holders for use in a marine craft (i.e., a boat). Even more particularly, this invention relates to fishing rod holders which are insertable into conventional openings normally used for beverage holders in a marine craft.

BACKGROUND OF THE INVENTION

Marine craft (i.e., boats) are available in various styles and sizes and normally include many features for the comfort and convenience of the operators and passengers. Such boats also typically include beverage holders (i.e., round cup-shaped receivers) which are slidably received in appropriately shaped openings in the hull or other permanent structure of the boat.

However, such boats do not include fishing rod holders. Although it is possible to drill holes or openings into the hull or other permanent structure to mount a fishing rod holder, this requires permanent alteration or modification of the boat structure, which is undesirable. For example, the alteration or modification could result in damage to the structure or weakening of the structure. It also requires the use of additional hardware.

Various types of fishing rod holders and fishing rod modifications have been previously proposed. See, for example, U.S. Pat. Nos. 1,527,463; 2,680,923; 2,902,789; 2,946,546; 2,981,509; 3,121,290; 3,557,483; 3,782,613; 4,375,731; 4,578,891; and Des. 200,474. None of such holders and devices, however, are suitable for the purposes described herein.

There has not heretofore been described a fishing rod holder adaptable for insertion into an existing opening (i.e., beverage holder opening) in a boat.

SUMMARY OF THE PRESENT INVENTION

In accordance with the present invention there is provided a fishing rod holder for removable insertion into an existing opening (normally used for a beverage holder) in a boat (e.g., in the hull or other structure of the boat). The fishing rod holder is adapted to receive and support the handle end of a fishing rod.

The fishing rod holder of the invention comprises:
(a) a tubular body member having upper and lower ends, wherein the upper end includes an outwardly projecting flange; and
(b) a tubular receiver secured within the body member, the receiver having upper and lower ends, wherein the upper end is open to enable the handle end of the fishing rod to be slidingly inserted therein.

The fishing rod holder is easily inserted into the existing opening in the boat without any modification or alteration of the boat required. The fishing rod holder can also be easily removed at any time and replaced with the beverage holder, if desired. The fishing rod holder can be easily moved from one location to another, or from one boat to another.

The tubular receiver in the holder is preferably tilted at an angle with respect to the longitudinal axis of the tubular body member. The length of the tubular receiver and the body member may also be varied.

Other advantages of the fishing rod holder of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
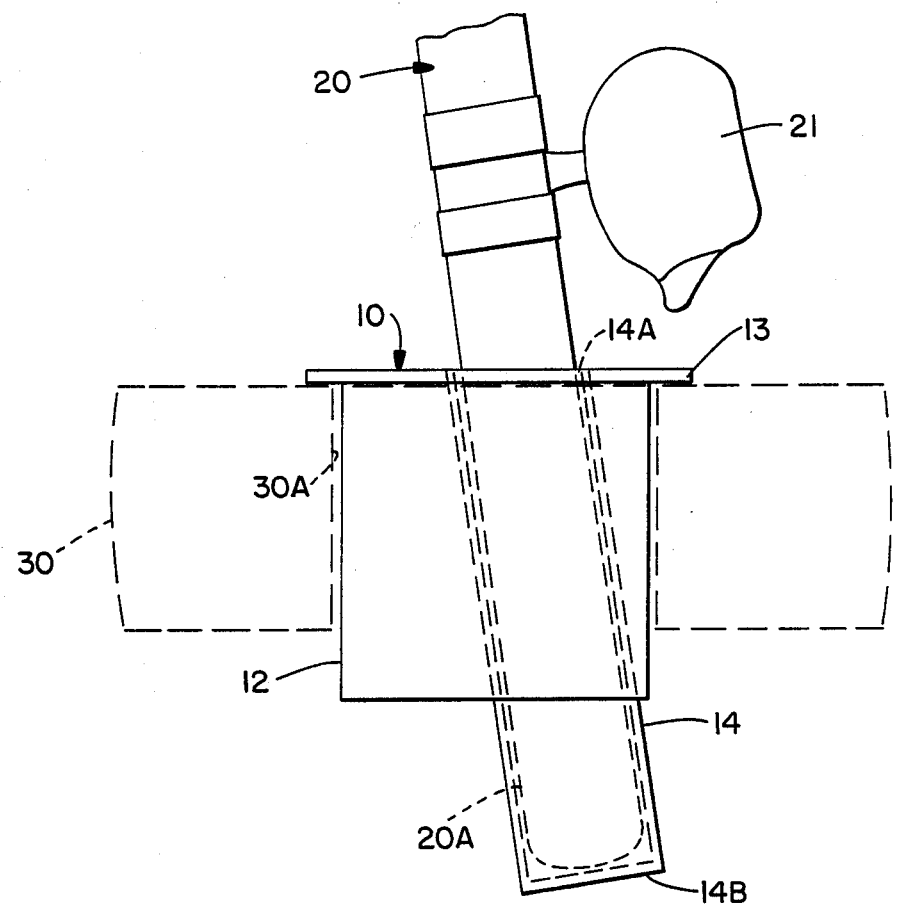
FIG. 1 is a side elevational view illustrating one embodiment of fishing rod holder of the invention which has been inserted into an existing opening in the hull of a boat.
Figure 2:
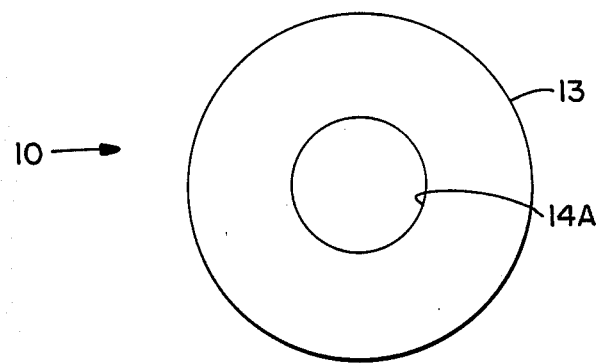
FIG. 2 is a top view of the fishing rod holder shown in FIG. 1.

Thus, in FIGS. 1 and 2 there is illustrated one embodiment of fishing rod holder 10 of the invention which is shown in FIG. 1 as having been slidably inserted into an existing opening 30A in a boat hull 30. The opening 30A is normally used for receiving and supporting a beverage holder (i.e., typically a plastic cup-shaped receiver in which a can, bottle or glass is supported).

This opening is typically made at the factory during the manufacture of the boat. The opening is generally round or circular and is normally about $2\frac{7}{8}$ inches in diameter. The beverage holder placed in the opening is generally cylindrical and sized so as to snugly fit into the opening.

The fishing rod holder 10 includes a generally round body member 12 which is preferably cylindrical. The upper end of the body 12 includes an outwardly projecting lip or flange portion 13. The flange preferably extends outwardly in a horizontal plane and is adapted to rest upon the upper surface of the boat hull around the opening 30A, as illustrated in FIG. 1. The flange may extend continuously around the upper edge of the body 12, or it may be discontinuous, if desired.

The body 12 may have a height which is in the range of about 2 to 4 inches. Generally, a height of about 1.5 to 3 inches is adequate. The diameter of body 12 should closely approximate the size of the opening 30A in the hull. Generally, a diameter of about $2\frac{3}{4}$ to $2\frac{7}{8}$ inches is used, depending upon the size of opening 30A. It is preferred for the outer diameter of body 12 to be about 0.1 inch less than the diameter of opening 30A.

Secured within body 12 is a tubular receiver 14 whose upper end 14A is open. For example, the tubular receiver could be molded with the body member as an integral unit or it may be welded to the body member. The lower end 14B may be open or closed, as desired. Preferably the receiver 14 is circular in cross-section, although other shapes could also be used.

Preferably the tubular receiver 14 is tilted at an angle with respect to the longitudinal centerline of the body member 12. For example, the angle of tilt may vary from about 0° to 45° (preferably 7° to 30°).

The handle end 20A of fishing rod 20 (with reel 21 secured thereto) is slidingly received in the tubular receiver 14, as illustrated. The tubular receiver preferably has a diameter in the range of about 1.25 to 1.5 inches for accommodating different sizes of fishing rod handles. Preferably the tubular receiver is only slightly larger than the handle of the fishing rod so that the fishing rod is prevented from flopping from side to side.

The length of the tubular receiver may also vary. Preferably it extends blow the lower end of body 12, and it may also extend above the upper end of body 12 if desired. For example, it may extend above the upper end of body 12 about 1 or 2 inches, and it may extend below the lower end of body 12 about 1 to 3 inches, if desired.

The tubular receiver may have solid, continuous walls extending the full length thereof, as shown in FIG. 1, or the walls may be discontinuous or they may have slots or apertures therethrough, if desired. For example, the tubular receiver may include two or more segments which are axially aligned (e.g., an upper segment may be distinct from a lower segment, with the segments being in axial alignment).

Figure 3:
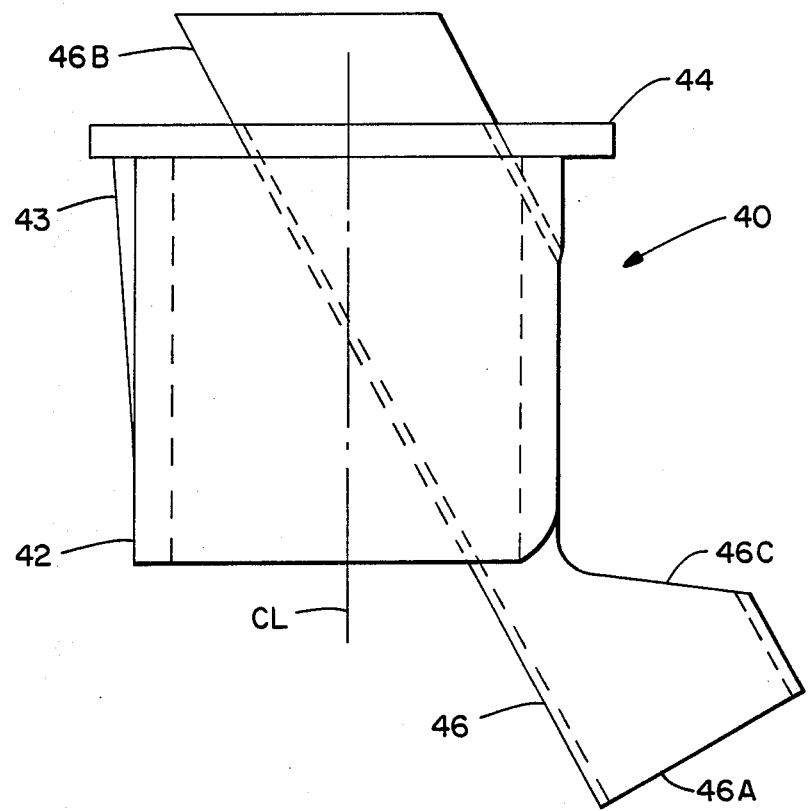
FIG. 3 is a side elevational view of another embodiment of fishing rod holder of the invention.
Figure 4:
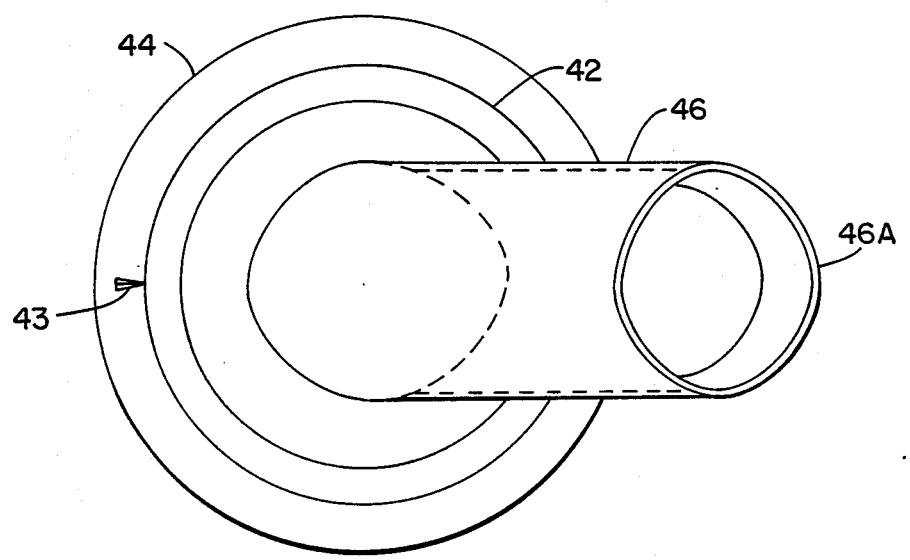
FIG. 4 is a bottom view of the fishing rod holder shown in FIG. 3.

In FIGS. 3 and 4 there is shown a side elevational view and bottom view, respectively, of another embodiment of fishing rod holder 40 of the invention. The holder includes a tubular body member 42 having a circular, outwardly projecting flange 44 at its upper end. The flange may extend completely around the upper edge of body 42 or it may be discontinuous, if desired.

As illustrated, the tubular receiver 46 is tilted at an angle with respect to the longitudinal centerline CL of body 42. The angle of tilt may vary, as desired.

The length of the tubular receiver 46 may also vary. It is shown as extending above the upper end of body 42. As illustrated, a portion of the wall of receiver 46 has been removed near the lower end thereof as being unnecessary.

FIGS. 3 and 4 also illustrate another variation of the invention. An elongated V-shaped wedge member 43 extends along the outer wall of body 42, as illustrated. This wedge slopes outwardly from the lower portion of body 42 to the upper edge of body 42. This wedge is useful in securing a frictional engagement between the body member 42 and the opening in the boat hull.

Preferably the wedge is about 1.5 inches long. The wedge should be about ⅛ inch wide at the upper end (i.e., so that it projects outwardly from body 42 about ⅛ inch). Other types of wedges or equivalent means may be used to facilitate such frictional engagement.

The fishing rod holders of the invention may be made of impact-resistant plastics, or metal, or composite materials, for example. The fishing rod holder could be molded as an integral unit, for example.

Other variants are possible without departing from the scope of the invention. The upper and lower ends of the tubular body member may be open or closed so long as the upper end of the tubular receiver is open to receive the handle end of a fishing rod. The lower end of the receiver may be open or closed, as desired. It is also possible to include retention or catch means on the flange or upper end of the body member for the purpose of facilitating retention or locking of the fishing rod in the tubular receiver.

What is claimed is:

1. A fishing rod holder for removable insertion into an existing opening in a boat for the purpose of receiving and supporting the handle end of a fishing rod, said fishing rod holder comprising,
   (a) a tubular cylindrical body member having upper and lower ends, wherein said upper end includes an outwardly projecting flange; wherein said tubular body member is circular in cross-section;
   (b) a hollow tubular receiver non-movably secured within said body member, said receiver having upper and lower ends positioned adjacent the upper and lower ends of said body member, respectively, wherein said tubular receiver is sized to enable said handle end of said fishing rod to be slidingly inserted therein; wherein said tubular receiver has a circular cross-section and is tilted at an angle with respect to the longitudinal axis of said body member.

2. A fishing rod holder in accordance with claim 1, wherein the diameter of said tubular receiver is in the range of about 1.25 to 1.5 inches.

3. A fishing rod holder in accordance with claim 1, wherein said upper end of said tubular receiver extends above said upper end of said body member, and wherein said lower end of said tubular receiver extends below said lower end of said body member.

4. A fishing rod holder in accordance with claim 1, wherein said body member has a height in the range of about 1.5 to 3 inches.

5. A fishing rod holder in accordance with claim 1, wherein said lower end of said tubular receiver extends through said body member.

6. A fishing rod holder in accordance with claim 1, wherein said body member includes an outer edge on which there is carried a wedge for securing said body member in said opening in said boat.

7. A method for supporting the handle end of a fishing rod in a boat of the type having a circular opening therein and a removable beverage holder in said opening, the method comprising the steps of:
   (a) providing a fishing rod holder comprising:
      (i) a tubular cylindrical body member having upper and lower ends, wherein said upper end includes an outwardly projecting flange; wherein said tubular body member is circular in cross-section;
      (ii) a hollow tubular receiver non-movably secured within said body member, said receiver having upper and lower ends positioned adjacent the upper and lower ends of said body member, respectively, wherein said tubular receiver is sized to enable said handle end of said fishing rod to be slidingly inserted therein; wherein said tubular receiver has a circular cross-section and is tilted at an angle with respect to the longitudinal axis of said body member; wherein the diameter of said tubular receiver is in the range of about 1.25 and 1.5 inches;
   (b) removing said beverage holder from said opening in said boat;
   (c) inserting said fishing rod holder into said opening in said boat; and
   (d) inserting said handle of said fishing rod into said tubular receiver.

8. A method in accordance with claim 7, wherein said lower end of said tubular receiver extends through said body member.

9. A method in accordance with claim 7, wherein the diameter of said tubular receiver is in the range of about 1.25 to 1.5 inches; and wherein said body member has a height in the range of about 1.5 to 3 inches.

10. In a boat of the type including an opening for receiving a beverage holder, the improvement which comprises a fishing rod holder inserted into said opening for the purpose of receiving and supporting the handle end of a fishing rod, said fishing rod holder comprising:

(a) a tubular cylindrical body member having upper and lower ends, wherein said upper end includes an outwardly projecting flange wherein said tubular body member is circular in cross-section;

(b) a hollow tubular receiver non-movably secured within said body member, said receiver having upper and lower ends positioned adjacent the upper and lower ends of said body member, respectively, wherein said tubular receiver is sized to enable said handle end of said fishing rod to be slidingly inserted therein; wherein said tubular receiver has a circular cross-section and is tilted at an angle of about 7 to 30° with respect to the longitudinal axis of said body member; wherein the diameter of said tubular receiver is in the range of about 1.25 to 1.5 inches; and wherein said body member has a height in the range of about 1.5 to 3 inches.

11. The improvement in accordance with claim 10, wherein said upper end of said tubular receiver extends above said upper end of said body member, and wherein said lower end of said tubular receiver extends below said lower end of said body member; and wherein said lower end of said tubular receiver extends through said body member.

12. The improvement in accordance with claim 10, wherein said body member includes an outer edge on which there is carried a wedge for securing said body member in said opening in said boat.

* * * * *